Oct. 19, 1965  I. J. KARASSIK ET AL  3,212,566
SERVICE WATER STERILIZATION SYSTEM
Filed March 13, 1964
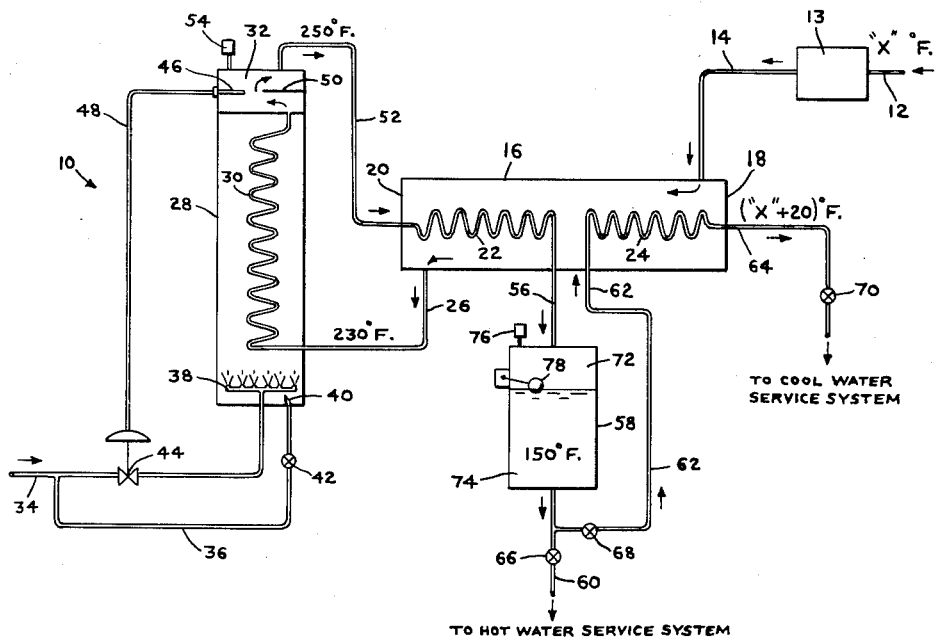
FIG. 1
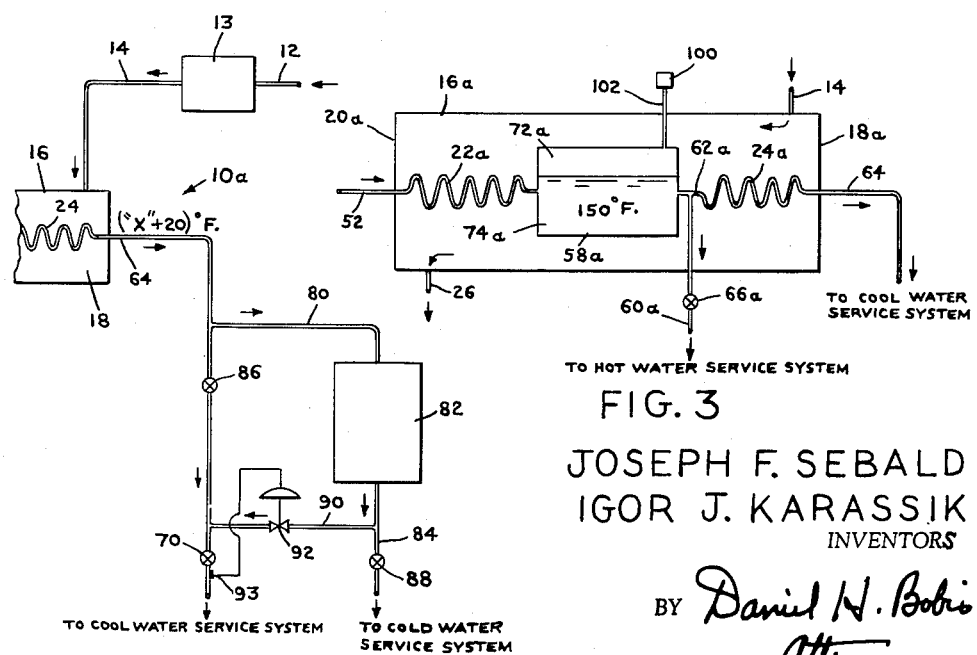
FIG. 2
FIG. 3
JOSEPH F. SEBALD
IGOR J. KARASSIK
INVENTORS
BY Daniel H. Bobis
Atty

3,212,566
SERVICE WATER STERILIZATION SYSTEM
Igor J. Karassik, Maplewood, and Joseph F. Sebald, Bloomfield, N.J., assignors to Worthington Corporation, Harrison, N.J., a corporation of Delaware
Filed Mar. 13, 1964, Ser. No. 351,796
9 Claims. (Cl. 165—66)

This invention relates generally to a service water sterilization system. More particularly, the invention relates to a service water sterilization system for providing a potable water supply from a non-potable, or suspected non-potable source.

The sterilization system is directed at the complete destruction of all harmful micro-organisms. It is a known fact that few micro-organisms in the presence of moisture can long survive a temperature above 176° F. In the presence of moisture even the spores of some bacteria require temperatures as high as 284° F. or higher for their complete destruction. Thus, sterilization is necessary to destroy harmful and undesirable bacterial organisms, virus organisms, protozoa, molds and spores, which all form part of the general classification of micro-organisms.

Heretofore, sterilization systems have required (1) an excess amount of equipment to control or cool the system; (2) have not been adaptable for direct delivery of hot sterilized water to a service system within a specified range of temperature.

An object of the present invention is to provide a sterilization system which overcomes the prior art difficulties; which provides circulation through the hot sterilized water storage means whether the demand is for hot, cool, or cold service water; which reduces radiation heat losses or the amount of insulation to prevent such losses by providing usable hot sterilized water at lower suitable hot water temperatures; which uses counterflow heat exchange through the heat exchanger to cool the hot sterilized water and pre-heat the unsterilized; water; which provides for intermediate discharge of the counterflow of the hot sterilized water in the heat exchanger for direct use from a hot water service system.

Another object of this invention is to provide a sterilization system of simple design which is both reliable and economic; which will be automatically controlled within the desired ranges of use for the sterilized water whether for use with the hot, cool, or cold water service system; and which eliminates or limits scaling within the system.

Other objects and advantages will be apparent from the following description of several embodiments of the invention and the novel features will be particularly pointed out hereinafter in the claims.

In the drawings:

FIGURE 1 is a schematic flow diagram illustrating the process and apparatus of the invention.

FIGURE 2 is also a schematic flow diagram of another form of the invention which provides for the delivery of cold sterilized water to service system.

FIGURE 3 is a schematic flow diagram of another form of the heat exchanger usable with the present invention.

In the embodiment of the invention as stated in FIGURE 1 the novel sterilization system 10 is shown schematically. The unsterilized water to be treated is delivered at a sufficiently high pressure so as to prevent the water from boiling at the maximum expected temperature in the sterilization system 10. This has the dual advantage of shortening the required holding period for sterilization and also conserving the quantity of B.t.u.'s required by sterilization system 10 as no latent heat is required or used.

Sterilization system 10 of FIGURE 1 has an inlet 12 through which the unsterilized water from a suitable pressure source is introduced into system 10. Inlet 12 is formed continuous with line 14 in which is disposed a water softener unit 13 for removing any possible scale forming salt contained in the unsterilized water.

The unsterilized water introduced into inlet 12 is at a certain temperature, normally ambient and designated generally as "X" ° F., which temperature is within the temperature range contemplated for the system.

The unsterilized water in line 14 is delivered to heat exchanger 16 adjacent the outer end 18 thereof. The unsterilized water in heat exchanger 16 will pass from outer end 18 to inner end 20 of heat exchanger 16 in indirect heat exchange relationship with the hot sterilized water in the heat exchange coils 22 and 24, respectively.

Pipe 26 will deliver the pre-heated unsterilized water, now at 230° F. or other suitable temperature from heat exchanger 16 to heater 28, in which it will pass through heat exchange coil 30 into sterilization holding chamber 32 of heater 28. Heater 28 can be any typical type heater such as a fuel fired or multitube heater, having a suitable source of heat energy delivered thereto by fuel line 34. Fuel line 34 has a pilot line 36 connected thereto for the usual automatic lighting of burner 38 of heater 28 by means of a pilot 40. Pilot line 36 is controlled by manual valve 42, which is normally open. Thermostatic control valve 44 is disposed in fuel line 34 downstream of pilot line 36 and regulates the flow of the fuel, either gas or oil, and fuel line 34 responsive to signals received from thermostatic element 46 to line 48. Thermostatic element 46 and valve 44 are pre-set to maintain the temperature in holding chamber 32 at 250° F. or any other suitable temperature so that proper sterilization of the water passing through heater 28 is insured. Holding chamber 32 is of sufficient size to retain the water passing therethrough a sufficient number of seconds to complete the sterilization thereof. To assist in this retention a baffle 50 is disposed between the discharge of heat exchange coil 30 and the connection of line 52 to holding chamber 32. To prevent a dangerous buildup of pressure in chamber 32, a relief valve 54 is connected thereto in the usual manner.

The sterilized water, at 250° F. or other suitable temperature in line 52 will enter heat exchange coil 22 substantially at this temperature. In heat exchange coil 22 the hot, sterilized water will pass in indirect exchange relationship with the unsterilized water and the temperature thereof will be reduced to 150° F. or other suitable temperature prior to its being delivered in line 56, which line is located intermediate to inner end 20 and outer end 18 of heat exchanger 16, to a storage tank 58 which will hold a pre-determined quantity of sterilized water at the desired hot water service system delivery temperature, designated generally at 150° F. From storage tank 58 the hot sterilized water will be discharged in line 60 to the hot water service system, or will be returned to heat exchanger 16 for further temperature reduction by line 62 which connects into line 60 and delivers the sterilized water at 150° F. to heat exchange coil 24 from which the sterilized water will pass in further indirect heat exchange relationship to the unsterilized water prior to being discharged from heat exchanger 16 by line 64, from which it is delivered to the cool water service at a temperature of ("X"+20)° F. (or other suitable design temperature difference.) Lines 60, 62 and 64 are conveniently provided with valves 66, 68 and 70, respectively, for the control of the sterilized water flowing therein. Depending on the system requirements, valves 66, 68 and 70 may be manually or automatically controlled.

It is noted that the hot sterilized water in storage tank 58 will be maintained at the indicated temperature as there is continuous circulation from storage tank 58 to the hot water service system through line 60 or to heat exchanger 16 through line 62. In this way it is possible to have the pre-determined quantity or hot sterilized water at the desired temperature of 150° F. for extended periods of intermittent or continuous use.

To provide for an even and smooth discharge of the sterilized water from storage tank 58, an air cushion at a pre-determined pressure is allowed to form in space 72 above the liquid portion 74 in the storage tank 58. The volume of the air cushion may be controlled by a suitable valve 76, operating independently of, or in combination with float mechanism 78.

One of the unsolved problems of the prior art has been the formation of scale in the storage tank. As is well known the solubility of the common scale forming salts decreases with the increase of temperature. Therefore, the higher the storage temperature the more insoluble the incrustating calcium and magnesium salts, depending upon the saturation pH of the solution, will cause these scales to crystallize or precipitate out of solution. Hence, as an alternative to water softener 13, scale formation can, in certain instances, be retarded by maintaining a closed system throughout the high temperature zones of the system. This is accomplished by selecting the temperature for stored hot sterilized water at use temperature (lower than the maximum system temperature) at which condition, because of the air cushion, the scale forming tendency though increasing is compensated for by the lower use temperature selected for storage. By way of explanation the use of an air cushion in space 72 will provide a place for the collection of the dissolved gases now given off and which were increased in quantity during the heating of the water in system 10. The gases leaving the solution will cause the pH thereof to rise which promotes the tendency for the formation of scale, but since it is occurring at the lowest possible storage temperature, control is effected.

While the hot sterilized water delivered to the hot water service system has been designated generally as deliverable at a temperature of 150° F., this temperature may vary within the range of 130–170° F. dependent upon the inlet water conditions and controls within the system 10. The sterilized water in line 64 is delivered to the cool water service system at a temperature ("X"+20)° F., which temperature shall not exceed 80° F.

In the embodiment of the invention illustrated in FIGURE 2, another form of the novel sterilization system, designated generally 10a and substantially identical to sterilization system 10 with the exception of the addition of suitable equipment and discharge to a cold water service system. Accordingly, the character references for the same components and equipment shown in FIGURE 1 will be repeated, and in view of the fact that the equipment and mode of operation of system 10a are similar to system 10, only those parts which are different or necessary for clarity and understanding are shown in FIGURE 2. Thus FIGURE 2 shows the inlet 12 to which the unsterilized water is delivered and the water softener 13 through which the unsterilized water passes through line 14, conducting the unsterilized water from softener 13 to heat exchanger 16 from which it will pass in indirect heat exchange relationship with the hot sterilized water from heater 28 (not shown), and return to heat exchanger 16 for circulation through storage tank 58 (not shown). When the hot sterilized water is not delivered by line 60 (not shown) to the hot water service system it will be conducted through line 62 (not shown) to heat exchange coil 24 wherein the hot sterilized water will pass in indirect heat exchange relationship with the incoming unsterilized water and the discharge in line 64 to the cool water service system. The discharge temperature in line 64 will be ("X"+20)° F. In order to provide a cold water service system having a delivery temperature of 50–55° F., a line 80 delivers the sterilized water from line 64 through a refrigeration unit 82 to a line 84 conducting the sterilized water to the cold water service system at the desired temperature. Line 64 and line 84 have valves 86 and 88, respectively, disposed therein, which valves may be suitably controlled either manually or automatically.

The selective range of the sterilized water delivered to the cool water service system can be suitably controlled by providing a bypass line 90 to connect line 84 to line 64. Thermostatic valve 92 is disposed in bypass line 90 so as to regulate the amount of water to be delivered from line 84 to line 64, so as to get the proper temperature mix, indicated by signal 93 to enable the final water delivered from line 64 to be at the desired temperature. Refrigeration unit 82 can be any suitable unit readily available on the open market.

Another form of the heat exchanger, designated generally 16a, is shown in FIGURE 3 and may be used with either sterilization system 10 or 10a. Heat exchanger 16a has storage tank 58a disposed therein. Heat exchanger 16a operates substantially identical to heat exchanger 16 and is connected to the same lines 14, 26, 52 and 64. Unsterilized water enters heat exchanger 16a from line 14 and passes in indirect heat exchange relationship with the hot, sterilized water before leaving through line 26. The hot, sterilized water enters heat exchange coil 22a from line 52 and passes in indirect heat exchange relationship with the unsterilized water. From heat exchange coil 22a the hot, sterilized water is delivered to a storage tank 58a located intermediate to the outer end 18a and the inner end 20a of heat exchanger 16a. The location of storage tank 58a is predetermined by the temperature at which the sterilized water is to be stored and is positioned generally intermediate in the heat exchanger 16a, for storage at the indicated temperature of 150° F. In storage tank 58a an air cushion is developed from the collection of dissolved air which was driven from the sterilized water. The air cushion is collected in space 72a located above the stored water in portion 74a. Relief valve 100 is connected by line 102 to space 72a to prevent excessive buildup of pressure in the air cushion in space 72a. From storage tank 58a the sterilized water is delivered to line 62a for discharge through line 60a to the hot water service system, or is passed through heat exchange coil 24a for further cooling prior to discharge in line 64 to cooling water service system. Line 60a has a control valve 66a disposed therein to control the flow of the sterilized water in line 60a.

It will be understood that various changes in the details, materials, arrangement of parts and operating conditions which have been herein described and illustrated in order to explain the nature of the invention may be made by those skilled in the art within the principles and scope of the invention as expressed in the claims.

What is claimed is:

1. A sterilization system for providing sterilized water from a non-sterilized source of water under pressure comprising:
   (a) an inlet for the un-sterilized water,
   (b) a heat exchanger,
   (c) a heater having a heat exchanger coil therein,
   (d) means to supply heat energy to the heater,
   (e) means to conduct the un-sterilized water from the inlet through the heat exchanger to the heat exchange coil of the heater,
   (f) means extending through said heat exchanger to conduct the heated sterilized water from the heat exchange coil of the heater into the heat exchanger in first indirect heat exchange relationship with the un-sterilized water,
   (g) storage means connected to the last mentioned means to receive sterilized water therefrom,
   (h) said heater having a holding chamber to which the heat exchanger coil in the heater is connected which holding chamber is adapted to receive and hold a limited amount of sterilized water therein and to connect with said storage means to maintain the sterilized water therein at a predetermined temperature,
(i) means to conduct the sterilized water from the storage means to any suitable source of hot water service and,
(j) means connecting the storage means to said heat exchanger to conduct the stored sterilized water therefrom into second indirect heat exchange relationship with the un-sterilized water,
(k) and means to deliver said stored sterilized water from said second indirect heat exchange relationship to a cool water service system.

2. The combination claimed in claim 1 wherein:
a water softener means is disposed in the means which conduct the un-sterilized water from the inlet through the heat exchanger at a point between the inlet and the heat exchanger to soften the water and remove scale forming salt therein.

3. The combination claimed in claim 1 wherein:
the holding chamber is disposed in super position to the heat exchange coil.

4. The combination claimed in claim 3 wherein:
the holding chamber having baffle means therein to divert the flow of the sterilized water and provide for a minimum holding period of the sterilized water therein.

5. The combination claimed in claim 1 wherein:
control means connected to the heater operative responsive to the temperature of the sterilized water in the heater and to control the means supplying heat energy to the boiler, so that the sterilized water can be maintain at a pre-determined temperature.

6. The combination claimed in claim 1 wherein:
(a) a refrigeration system, and
(b) means to conduct the cool sterilized water from the heat exchanger through the refrigeration system in heat exchange relationship therewith whereby the sterilized water may be delivered to a cold water service system.

7. The combination claimed in claim 6 wherein:
(a) means interconnecting the cool water service system and the cold water service system, and
(b) a valve having a thermostatic control disposed in the last mentioned means, whereby the final discharge temperature of the cool water service system and the cold water service system is regulated at a predetermined temperature, controlled by the valve mixing the cool and cold sterilized water.

8. The combination claimed in claim 1 wherein:
the storage means is disposed outwardly of and adjacent to the heat exchanger.

9. The combination claimed in claim 1 wherein:
the storage means is disposed within the heat exchanger.

References Cited by the Examiner
UNITED STATES PATENTS

| | | | |
|---|---|---|---|
| 1,471,718 | 10/23 | Bartlett | 210—181 |
| 1,996,136 | 4/35 | Zimmerman | 210—181 |
| 2,662,508 | 12/53 | Gaylor | 165—66 X |

CHARLES SUKALO, *Primary Examiner.*